United States Patent
Smieja

(10) Patent No.: US 12,162,338 B2
(45) Date of Patent: Dec. 10, 2024

(54) CANOPY SYSTEM FOR WORK MACHINE

(71) Applicant: Caterpillar Paving Products Inc., Brooklyn Park, MN (US)

(72) Inventor: Jameson Michael Smieja, Mound, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 195 days.

(21) Appl. No.: 17/933,945

(22) Filed: Sep. 21, 2022

(65) Prior Publication Data

US 2024/0092154 A1    Mar. 21, 2024

(51) Int. Cl.
*B60J 7/12*    (2006.01)
*B60J 7/14*    (2006.01)
*E01C 23/06*   (2006.01)

(52) U.S. Cl.
CPC ............ *B60J 7/1204* (2013.01); *B60J 7/143* (2013.01); *E01C 23/06* (2013.01); *E01C 2301/30* (2013.01)

(58) Field of Classification Search
CPC . B60J 7/1204; B60J 7/143; B60J 7/041; B60J 7/165; B60J 7/12; B60J 7/146; B60J 7/1628; B60J 7/1635; E01C 23/06; E01C 2301/30; B62D 33/0617; B62D 33/0621; E02F 9/16; E02F 9/163; E02F 9/166
USPC .............. 296/190.03, 107.16, 107.17, 190.1
See application file for complete search history.

(56) References Cited

U.S. PATENT DOCUMENTS

| | | | | |
|---|---|---|---|---|
| 2,919,156 A | * | 12/1959 | Dodge | B62D 33/0621 296/108 |
| 3,180,441 A | * | 4/1965 | Reaves | B62D 33/0621 280/847 |
| 5,839,758 A | * | 11/1998 | Finch | B60R 21/131 280/756 |
| 6,126,227 A | * | 10/2000 | Bitelli | B60J 7/165 296/107.03 |
| 7,246,835 B1 | | 7/2007 | Colburn et al. | |
| 7,594,562 B2 | | 9/2009 | Heusinger | |
| 8,641,093 B1 | * | 2/2014 | Knight | B60R 21/11 296/96.13 |
| 8,827,374 B2 | | 9/2014 | Huhn | |

(Continued)

FOREIGN PATENT DOCUMENTS

| | | | | | |
|---|---|---|---|---|---|
| CN | 108699784 A | * | 10/2018 | ........... | E01C 19/004 |
| CN | 118223367 A | * | 6/2024 | ............. | E01C 19/48 |

(Continued)

*Primary Examiner* — Hilary L Gutman

(57) ABSTRACT

A canopy system for a work machine includes a canopy assembly movable between a lowered position and a raised position. The canopy assembly includes a main canopy panel and a canopy wing, such that the canopy wing is movable relative to the main canopy panel between an extended position and a retracted position. The canopy system also includes a sensor system that generates a detection signal indicative of a presence of an object proximate to the work machine, and a controller communicably. The controller includes a memory and a processor. The processor receives the detection signal from the sensor system, determines a location of the object based on the detection signal, and generates a first control signal to partially move the canopy assembly towards the lowered position and away from the operator station or partially move the canopy wing towards the retracted position.

20 Claims, 6 Drawing Sheets

(56) References Cited

U.S. PATENT DOCUMENTS

| | | |
|---|---|---|
| 9,255,952 B2 | 2/2016 | Wuerstlein et al. |
| 9,764,690 B2 * | 9/2017 | Thelen .................. B62D 25/10 |
| 10,618,392 B2 | 4/2020 | Buschmann |
| 10,822,041 B2 | 11/2020 | Barimani et al. |
| 2014/0035344 A1 * | 2/2014 | Huhn .................... E01C 23/088 |
| | | 299/36.1 |
| 2021/0377492 A1 * | 12/2021 | Zieser .................... H04N 7/181 |

FOREIGN PATENT DOCUMENTS

| | | | |
|---|---|---|---|
| EP | 627159 A1 * | 12/1994 | ......... A01D 41/1208 |
| EP | 0810324 A1 * | 12/1997 | |
| EP | 2980004 A1 * | 2/2016 | ............ B60J 7/1642 |

\* cited by examiner

CANOPY SYSTEM FOR WORK MACHINE

TECHNICAL FIELD

The present disclosure relates to a canopy system for a work machine and a method of preventing collision of a canopy assembly of the work machine with objects proximate to the work machine.

BACKGROUND

A work machine, such as a milling machine or a paving machine, may be used to remove, mix, reclaim, or replace material from various surfaces. Typically, such work machines include a canopy that extends over an operator station of the work machine to shield a machine operator as well as machine controls/devices present in the operator station from environment effects, such as, sunlight and precipitation. However, under certain operating conditions, the canopy may affect a maneuverability of the work machine. In particular, during machine travel, the work machine may experience certain obstacles along a movement path. The obstacles may include aerial obstacles, such as, tree branches or power lines that may come in contact with the canopy. Further, the canopy may get damaged if the canopy comes into contact with such obstacles, thereby increasing machine downtime, repair costs, and/or replacement costs.

In some cases, the canopy may be lowered by the machine operator in order to prevent contact of the canopy with obstacles proximate to the work machine. Further, machine operators may have to manually move the canopy between a raised position and a lowered position, which may interfere with ongoing machine operations. Conventionally, when the canopy is being lowered, the canopy tends to come down on top of the operator station and may hinder machine operations being performed by the machine operator. Further, as the canopy passes through the operator station, machine operators may have to be aware of the lowering canopy and may have to reposition themselves to avoid being struck by the moving canopy. In some examples, the machine operator may decide not to use the canopy altogether because of the abovementioned shortcomings, which may decrease a value of the canopy and may also cause discomfort to the machine operator.

U.S. Pat. No. 10,822,041 describes an earth working machine, for example a road milling machine, recycler, stabilizer, or surface miner, having a propelling unit and a machine frame. The earth working machine comprises a working apparatus for earth working, and an operator's platform, having an operator's platform floor and having at least one operating device, being provided on the machine frame. The earth working machine comprises a protective canopy liftable and lowerable relative to the operator's platform floor between a lifted operating position and a lowered transport position. The earth working machine comprises a panel arrangement having an upper edge located closer to the protective canopy, having a lower edge located farther from the protective canopy at a distance from the upper edge, and having two side edges spanning the distance between the upper and the lower edges. The panel arrangement is being connected in an upper connecting region, located closer to its upper edge than to its lower edge, to the protective canopy and being connected in a lower connecting region, located closer to its lower edge than to its upper edge, to the machine frame and/or to the operator's platform floor constituting a connecting base. Provision is made that the panel arrangement is liftable and lowerable together with the protective canopy, the panel arrangement being received on the earth working machine with its lower edge movably toward and away from the operator's platform floor.

SUMMARY OF THE DISCLOSURE

In an aspect of the present disclosure, a canopy system for a work machine is provided. The canopy system includes a canopy assembly movable between a lowered position and a raised position. In the lowered position, the canopy assembly is disposed ahead of an operator station of the work machine relative to a machine travel direction and does not obstruct a line of sight from the operator station. In the raised position, at least a portion of the canopy assembly is disposed above the operator station. The canopy assembly includes a main canopy panel and at least one canopy wing, such that the canopy wing is movable relative to the main canopy panel between an extended position and a retracted position. The canopy system also includes a sensor system configured to generate a detection signal indicative of a presence of at least one object proximate to the work machine. The canopy system further includes a controller communicably coupled with the canopy assembly and the sensor system. The controller includes at least one memory and at least one processor communicably coupled to the memory. The processor is configured to receive the detection signal from the sensor system. The processor is also configured to determine a location of the object proximate to the work machine based on the detection signal. The processor is further configured to generate a first control signal to at least partially move the canopy assembly towards the lowered position and away from the operator station or at least partially move the canopy wing towards the retracted position.

In another aspect of the present disclosure, a work machine is provided. The work machine includes a frame. The work machine also includes an operator station supported by the frame. The work machine further includes a canopy system. The canopy system includes a canopy assembly coupled to the frame. The canopy assembly is movable between a lowered position and a raised position. In the lowered position, the canopy assembly is disposed ahead of the operator station of the work machine relative to a machine travel direction and does not obstruct a line of sight from the operator station. In the raised position, at least a portion of the canopy assembly is disposed above the operator station. The canopy assembly includes a main canopy panel and at least one canopy wing, such that the canopy wing is movable relative to the main canopy panel between an extended position and a retracted position. The canopy system also includes a sensor system configured to generate a detection signal indicative of a presence of the object proximate to the work machine. The canopy system further includes a controller communicably coupled with the canopy assembly and the sensor system. The controller includes at least one memory and at least one processor communicably coupled to the memory. The processor is configured to receive the detection signal from the sensor system. The processor is also configured to determine a location of the object proximate to the work machine based on the detection signal. The processor is further configured to generate a first control signal to at least partially move the canopy assembly towards the lowered position and away from the operator station or at least partially move the canopy wing towards the retracted position.

In yet another aspect of the present disclosure, a method of preventing collision of a canopy assembly of a work machine with at least one object proximate to the work machine is provided. The method includes receiving, by a controller, a detection signal indicative of a presence of the object proximate to the work machine. The method also includes determining, by the controller, a location of the object proximate to the work machine based on the detection signal. The method further includes generating, by the controller, a first control signal to at least partially move the canopy assembly towards a lowered position and away from an operator station of the work machine or at least partially move at least one canopy wing of the canopy assembly towards a retracted position. In the lowered position, the canopy assembly is disposed ahead of the operator station relative to a machine travel direction and does not obstruct a line of sight from the operator station.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
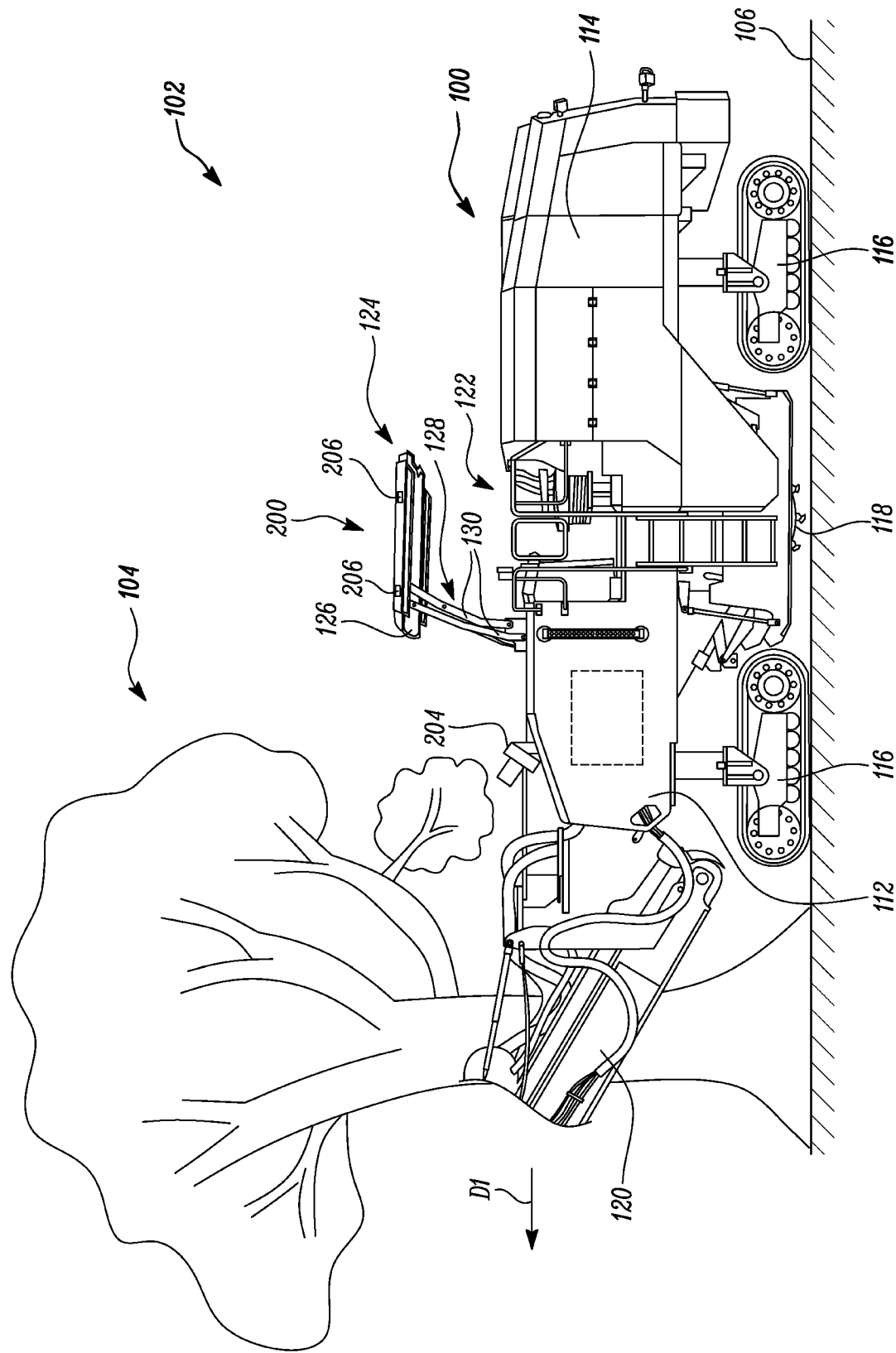
FIG. 1 is a schematic side elevational view of a work machine, wherein a canopy assembly of the work machine is in a raised position, according to an example of the present disclosure.

Referring to FIG. 1, a schematic side view of an exemplary work machine 100 is illustrated. The work machine 100 may perform one or more work operations associated with an industry, such as, mining, construction, farming, transportation, or any other industry known in the art. The work machine 100 is operating at a worksite 102. The worksite 102 may include one or more objects 104 present thereat. Further, the objects 104 may include aerial objects, such as, tree branches, cranes or other such machines, and/or overhead wires. The work machine 100 is embodied as a cold planer herein. The work machine 100 may be used to remove, mix, or reclaim material from a surface 106. The surface 106 may include, for example, a roadway. Alternatively, the work machine 100 may include a paving machine, or any other work machine having a canopy, without any limitations.

The work machine 100 defines a first side 108 (shown in FIGS. 2, 3, and 4) and a second side 110 (shown in FIGS. 2, 3, and 4) opposite the first side 108. The work machine 100 includes a frame 112 that supports various machine components thereon. The work machine 100 further includes a power source (not shown) that generates power. The power source may be an engine, such as, an internal combustion engine (e.g., a compression ignition diesel engine), a gas turbine engine, and the like. The power source is mounted on the frame 112. The power source is enclosed within an enclosure 114. The work machine 100 also includes a number of ground engaging members 116. Each ground engaging member 116 is embodied as a track herein. Alternatively, the work machine 100 may include wheels or drums instead of tracks.

The work machine 100 also includes a rotatable work tool 118 for milling the surface 106. The rotatable work tool 118 may include a rotatable drum (or a rotor) and a number of tools disposed on the rotatable drum. The work machine 100 further includes a loading conveyor 120. After being cut by the rotatable work tool 118, the material removed from the surface 106 may enter the loading conveyor 120 which may transfer the removed material into a dump truck (not shown) or other suitable machine for transporting the material. In some cases, the removed material can also be casted off to a side for pick-up or re-use at the worksite.

The work machine 100 further includes an operator station 122 supported by the frame 112. An operator of the work machine 100 may sit or stand in the operator station 122 to overlook machine operations. The operator station 122 may also include various control devices that may be used for controlling one or more operations of the work machine 100. The different control devices may include, but not limited to, pedals, levers, switches, buttons, wheels, and other such devices known in the art.

The work machine 100 further includes a canopy system 200. The canopy system 200 includes a canopy assembly 124 coupled to the frame 112. The canopy assembly 124 is movably coupled to the frame 112. The canopy assembly 124 is movable between a lowered position and a raised position. FIG. 1 illustrates the canopy assembly 124 in the raised position. In the raised position, at least a portion of the canopy assembly 124 is disposed above the operator station 122.

The canopy assembly 124 further includes a main canopy panel 126. The main canopy panel 126 has a length "L1" (shown in FIGS. 3 and 4) in a widthwise direction relative to a front-to-rear longitudinal axis of the work machine 100. The main canopy panel 126 may have a generally flat configuration that defines a barrier for blocking certain environmental effects such as, sun, rain, and snow. The main canopy panel 126 may include any shape suitable for covering the operator station 122. Further, the canopy assembly 124 includes a linkage system 128. The linkage system 128 includes multiple linkages 130 (only two of which are illustrated herein). The linkage system 128 may be movably coupled between the frame 112 and the main canopy panel 126.

The canopy assembly 124 further includes a first actuation system 132 (shown in FIG. 5) that moves the canopy assembly 124 between the lowered position and the raised position. In an example, the first actuation system 132 may include an actuator 134 (shown in FIG. 5) associated with the linkage system 128. The actuator 134 may include any one of a hydraulic actuator, a pneumatic actuator, or an electric actuator, without any limitations thereto. Further, the first actuation system 132 may include a sensor (not shown)

associated with the actuator 134 to generate a signal "I1" (shown in FIG. 5) related to a current position of the actuator 134.

Figure 2:
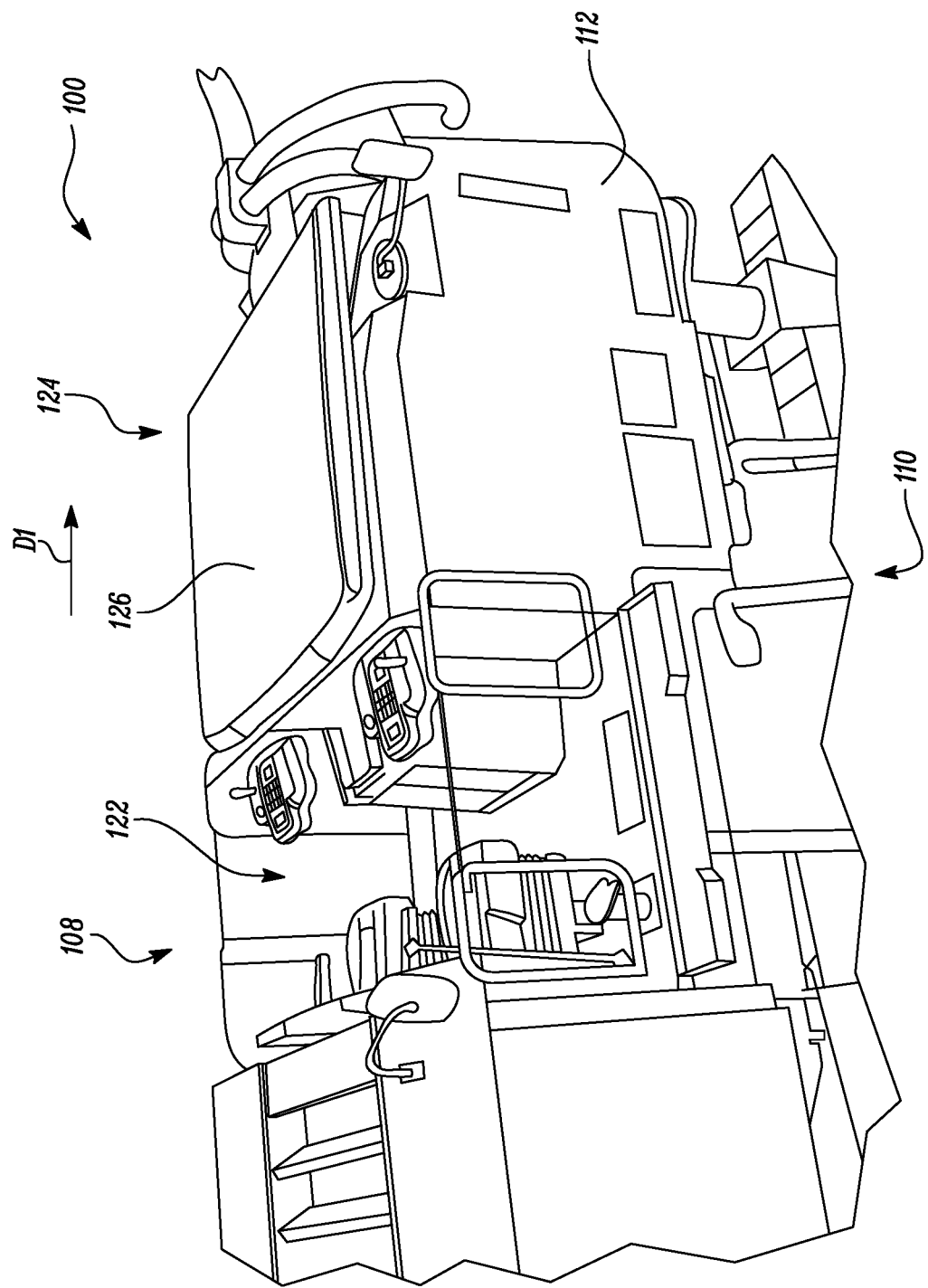
FIG. 2 is a schematic side perspective view of the work machine of FIG. 1 illustrating the canopy assembly in a lowered position.

FIG. 2 illustrates the canopy assembly 124 in the lowered position. More particularly, based on an actuation of the first actuation system 132 (see FIG. 5), the canopy assembly 124 may move from the raised position to the lowered position. In an example, the canopy assembly 124 may be moved to the lowered position to avoid collision of the canopy assembly 124 with the object 104 (see FIG. 1). Further, when the canopy assembly 124 is in the lowered position, the canopy assembly 124 may be disposed proximate to the frame 112. It should be noted that, when the canopy assembly 124 is in the lowered position, the canopy assembly 124 may not interfere with any components that are positioned on the frame 112. Further, in the lowered position of the canopy assembly 124, the linkage system 128 (see FIG. 1) may be substantially parallel to the main canopy panel 126.

As illustrated in FIG. 2, in the lowered position, the canopy assembly 124 is disposed ahead of the operator station 122 of the work machine 100 relative to a machine travel direction "D1" and does not obstruct a line of sight from the operator station 122. When the canopy assembly 124 is moving to the lowered position along a path determined by the linkage system 128 (see FIG. 1), the canopy assembly 124 moves away from the operator station 122, and may not hinder the operator from performing work operations. Moreover, in the lowered position, the canopy assembly 124 may be positioned such that the canopy assembly 124 permits the operator to have good visibility of a surrounding area of the work machine 100. It should be further noted that the canopy assembly 124 may be disposed at any position between the lowered position and the raised position, based on a control of the first actuation system 132. In other words, the canopy assembly 124 may be disposed in a partially lowered position. For example, in order to reduce interference of sunlight with operator's visibility, the operator may adjust the canopy assembly 124 to position the canopy assembly 124 in a manner that prevents sunlight from interfering with operator's visibility.

Figure 3:
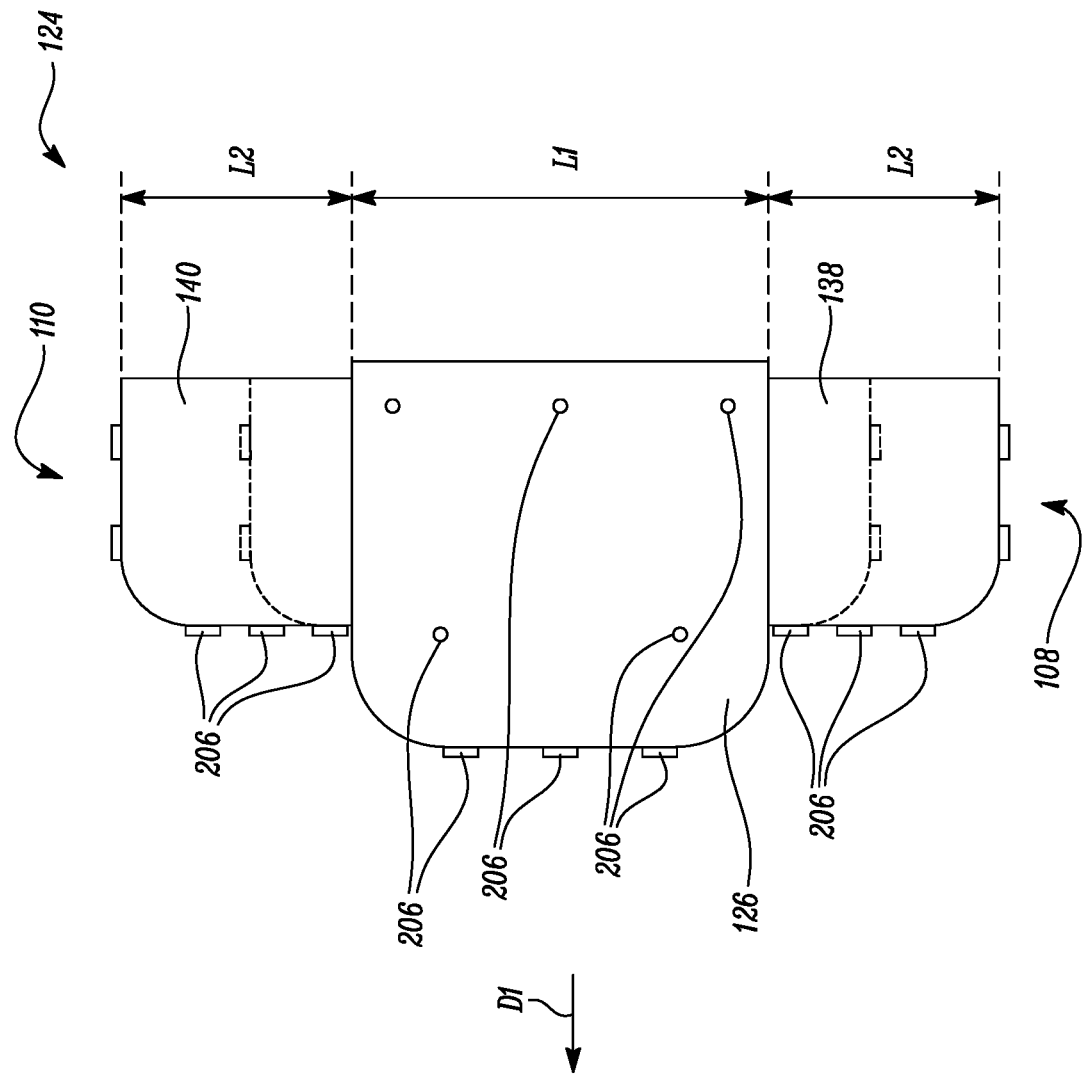
FIG. 3 is a schematic top plan view illustrating a pair of canopy wings of the canopy assembly of FIG. 1 in an extended position, according to an example of the present disclosure.

Referring to FIG. 3, a schematic top plan view of a portion of the canopy assembly 124 is illustrated. As illustrated in FIG. 3, the canopy assembly 124 includes one or more canopy wings 138, 140. In the illustrated example of FIG. 3, the canopy assembly 124 includes a pair of canopy wings 138, 140. The canopy wings 138, 140 are movable relative to the main canopy panel 126 between an extended position and a retracted position. The canopy wings 138, 140 are shown in the extended position in FIG. 3. In the extended position, the canopy wings 138, 140 extend in opposing directions so as to further shield the operator of the work machine 100 (see FIGS. 1 and 2) from surrounding or environmental effects. Further, each canopy wing 138, 140 includes a widthwise span "L2". The span "L2" may be lesser than the length "L1" of the main canopy panel 126.

The canopy wings 138, 140 may be slidably connected to the main canopy panel 126 so that the canopy wings 138, 140 may be extended and retracted relative to the main canopy panel 126. The canopy assembly 124 includes a second actuation system 142 (shown in FIG. 5) that moves the canopy wings 138, 140 between the retracted position and the extended position. The second actuation system 142 may include a pair of actuators (not shown herein). Specifically, each canopy wing 138, 140 may include a corresponding actuator. Further, the actuators may be disposed within the main canopy panel 126 to move the canopy wings 138, 140 between the extended position and the retracted position. In another example, the actuators may be disposed at an underside of the main canopy panel 126. The actuator may include any one of a hydraulic actuator, a pneumatic actuator, or an electric actuator, without any limitations thereto. Further, the second actuation system 142 may include a sensor (not shown) associated with the actuator 144 to generate a signal "I2" (shown in FIG. 5) related to a current position of the actuators 144.

Furthermore, the canopy wings 138, 140 may be disposed at any position between the extended position and the retracted position, based on a control of the second actuation system 142. For example, the canopy wings 138, 140 may be disposed in a partially retracted position (as depicted by dashed lines in FIG. 3) to prevent collision with the object 104 (see FIG. 1). Further, it may be possible to dispose only one of the canopy wings 138, 140 in the partially retracted position, based on application requirements. For example, the canopy wing 138 may be in the partially retracted position if the object 104 is present at the first side 108 of the work machine 100, whereas the canopy wing 140 may be in the extended position. It may be further possible to dispose one of the canopy wings 138, 140 in the extended position and the other of the canopy wings 138, 140 in the retracted position, based on application requirements. For example, the canopy wing 140 may be in the retracted position if the object 104 is present at the second side 110 of the work machine 100, whereas the canopy wing 138 may be in the extended position.

Figure 4:
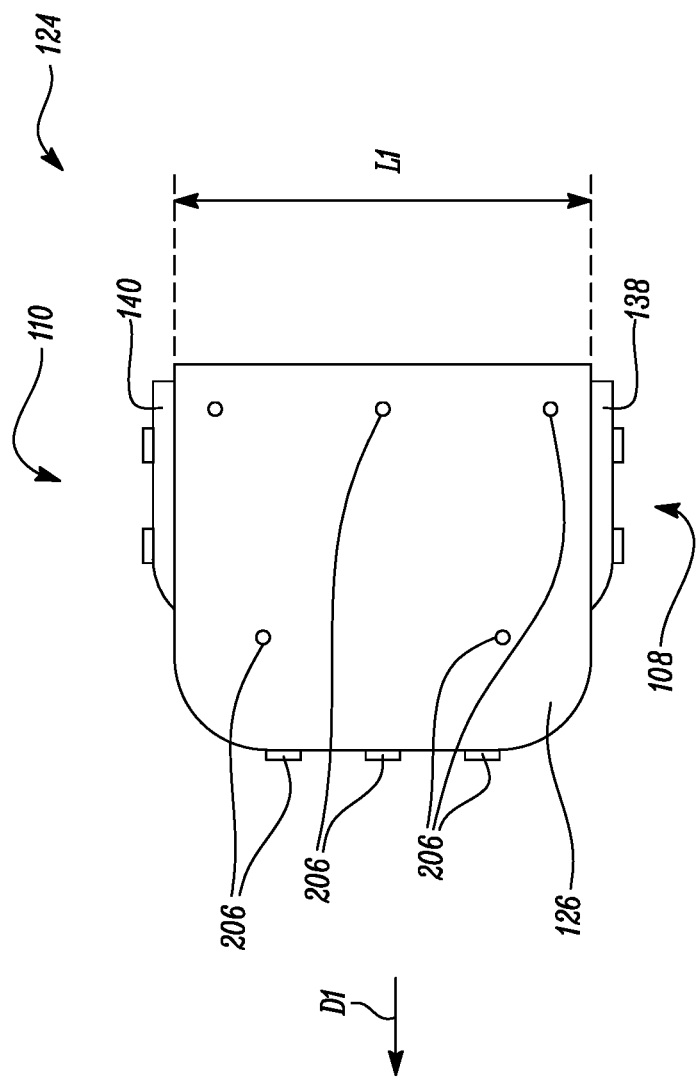
FIG. 4 is a schematic top plan view illustrating the canopy wings of FIG. 3 in a retracted position, according to an example of the present disclosure.

Referring now to FIG. 4, the canopy wings 138, 140 of the canopy assembly 124 are illustrated in the retracted position. The canopy wings 138, 140 of the canopy assembly 124 may be retracted to avoid collision of the canopy wings 138, 140 with the object 104 (see FIG. 1). In some examples, in the retracted position, a portion of the canopy wings 138, 140 may project outwards from the main canopy panel 126. Alternatively, in the retracted position, the canopy wings 138, 140 may be completely received within the main canopy panel 126. Alternatively, in the retracted position, the canopy wings 138, 140 may be disposed at the underside of the main canopy panel 126.

Figure 5:
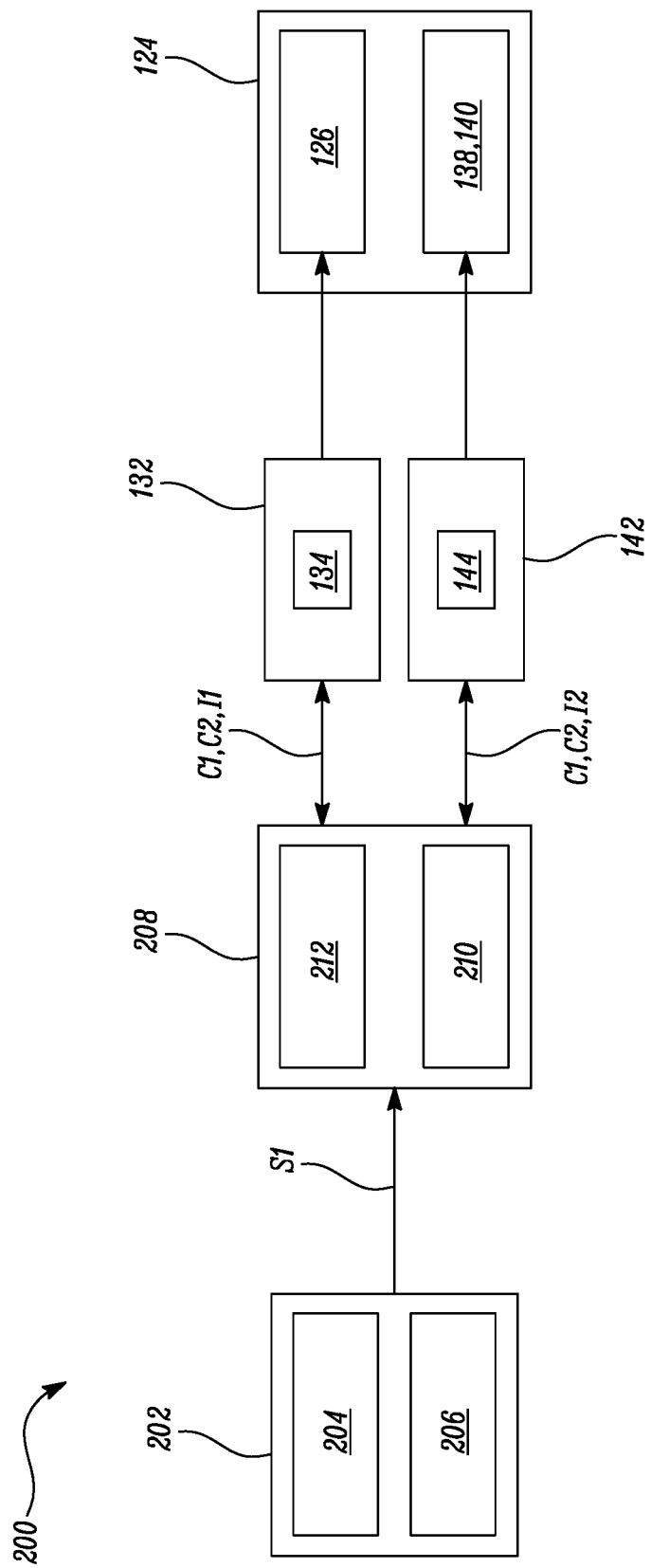
FIG. 5 is a block diagram of a canopy system associated with the work machine of FIG. 1, according to an example of the present disclosure.

Referring to FIG. 5, a block diagram of the canopy system 200 is illustrated. As discussed above, the canopy system 200 includes the canopy assembly 124 including the main canopy panel 126 and the canopy wings 138, 140.

The canopy system 200 also includes a sensor system 202 that generates a detection signal "S1" indicative of a presence of the one or more objects 104 (see FIG. 1) proximate to the work machine 100 (see FIGS. 1 and 2). It should be noted that the term "proximate" as used herein may imply that the one or more objects 104 may be present within a predetermined distance from the sensor system 202. The predetermined distance may be, for example, 1 meter, 2 meters, 10 meters, or 20 meters, without any limitations. In some instances, the predetermined distance may be a determined height of a portion of the object 104, e.g., a tree branch. It should be noted that a maximum value of the predetermined distance may vary based on a type of sensor associated with the sensor system 202 and detection ranges thereof. In some examples, the sensor system 202 may also generate a signal indicative of a distance of the objects 104 from the sensor system 202. Further, the sensor system 202 includes one or more of a light detection and ranging sensor (LIDAR), a radio detection and ranging sensor (RADAR), an ultrasonic sensor, an infrared sensor, a photoelectric sensor, a magnetic sensor, an imaging device, or a combination thereof. It should be noted that the present disclosure is not limited by a type of sensor associated with the sensor system 202.

The sensor system 202 includes one or more first sensors 204 mounted on the frame 112 (see FIG. 1) of the work machine 100. The first sensor 204 may be interchangeably referred to as the sensor 204. In the illustrated example of FIG. 5, a single first sensor 204 is mounted on the frame 112 of the work machine 100. However, in other examples, any number of first sensors may be mounted on the frame 112 of the work machine 100, without any limitations. Further, the first sensor 204 is embodied as a camera herein.

The sensor system 202 further includes one or more second sensors 206 mounted on the canopy assembly 124. The second sensor 206 may be interchangeably referred to as the sensor 206. In the illustrated example of FIG. 3, the second sensors 206 are mounted around a periphery and a top surface of the main canopy panel 126 as well as each canopy wing 138, 140. It should be noted that the canopy assembly 124 may include any number of second sensors 206 associated therewith. In some examples, the second sensors 206 may be mounted proximate to a front end of the canopy assembly 124 in relation to the machine travel direction "D1" so as to detect the presence of approaching objects.

It should be noted that the sensor system 202 may include the first sensors 204 as well as the second sensors 206. Alternatively, it may be contemplated that the sensor system 202 may include any one of the first sensors 204 and the second sensors 206. It should be further noted that, in some examples, the sensor system 202 may include additional sensors (not shown) associated therewith. In another example, the sensor system 202 may include one or more sensors (not shown) associated with the first actuation system 132 and the second actuation system 142 to generate information related to a current position of the first actuation system 132 and the second actuation system 142.

The canopy system 200 further includes a controller 208 communicably coupled with the canopy assembly 124 and the sensor system 202. Further, the controller 208 may be communicably coupled with the sensors associated with the first and second actuation systems 132, 142 in order to determine the current position of the actuators 134, 144, respectively. Although FIG. 5 shows the controller 208 communicably coupled to the canopy assembly 124 through the first actuation system 132 and the second actuation system 142, other modes of coupling, including direct coupling, are contemplated. The controller 208 includes one or more memories 210 and one or more processors 212 communicably coupled to the memories 210 (references to plural processors 212 below do not exclude use of a single processor 212). The processors 212 may include any device that performs logic operations. It should be noted that the processors 212 may embody a single microprocessor or multiple microprocessors for receiving various detection signals. Numerous commercially available microprocessors may be configured to perform the functions of the processors 212. The processors 212 may include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. The processors 212 may include one or more components that may be operable to execute computer executable instructions or computer code that may be stored and retrieved from the memories 210.

In the illustrated example of FIG. 5, the processors 212 receive the detection signal "S1" from the sensor system 202. It should be noted that the detection signal "S1" may be received from the first sensors 204 and/or the second sensors 206. The processors 212 also determine a location of the one or more objects 104 proximate to the work machine 100 based on the detection signal "S1". For example, the processors 212 may determine if the object 104 is present at the first side 108 (see FIG. 2) of the work machine 100 or the second side 110 (see FIG. 2) of the work machine 100. In some examples, the processors 212 may also determine the distance between the object 104 and the sensor system 202.

Further, the processors 212 generate a first control signal "C1" to at least partially move the canopy assembly 124 towards the lowered position and away from the operator station 122 (see FIGS. 1 and 2) and/or at least partially move the canopy wings 138, 140 towards the retracted position. Further, before generating the first control signal "C1", the processors 212 receives the signals "I1", "I2" for determining the current position of the actuators 134, 144, respectively. Thus, the processors 212 generates the first control signal "C1" based on the detection signal "S1" and the signals "I1", "I2".

The term "at least partially move the canopy assembly 124 towards the lowered position" implies that the canopy assembly 124 may either be moved to the lowered position or the canopy assembly 124 may be moved to the partially lowered position. Further, the term "at least partially move the canopy wings 138, 140 towards the retracted position" implies that the canopy wings 138, 140 may either be moved to the retracted position or the canopy wings 138, 140 may be moved to the partially retracted position. One or both of the canopy wings 138, 140 may be so moved.

In some cases, the first control signal "C1" may be generated to prevent collision of the canopy assembly 124 and/or the canopy wings 138, 140 with the object 104. In one example, the first control signal "C1" may be generated to move the canopy assembly 124 to the lowered position or the partially lowered position. It should be noted that the processors 212 may determine whether the canopy assembly 124 needs to be moved to the lowered position or the partially lowered position based on the distance between the object 104 and the sensor system 202. In another example, the first control signal "C1" may be generated to move each canopy wing 138, 140 to the retracted position or the partially retracted position. In yet another example, the first control signal "C1" may be generated to move only one of the canopy wings 138, 140 to the retracted position or the partially retracted position. It should be noted that the processors 212 may determine whether the canopy wings 138, 140 need to be moved to the retracted position or the partially retracted position based on the distance between the object 104 and the sensor system 202.

The first control signal "C1" may be transmitted to the first actuation system 132 and/or the second actuation system 142. In one example, upon receiving the first control signal "C1", the first actuation system 132 moves the canopy assembly 124 towards the lowered position or the partially lowered position. In another example, upon receiving the first control signal "C1", the second actuation system 142 moves the canopy wings 138, 140 towards the retracted position or the partially retracted position.

In some examples, the processors 212 further generate a second control signal "C2" to at least partially move the canopy assembly 124 towards the raised position or at least partially move the canopy wings 138, 140 towards the extended position. Further, the term "at least partially move the canopy assembly 124 towards the raised position" implies that the canopy assembly 124 may be moved to the raised position or the canopy assembly 124 may be moved to the partially lowered position. Furthermore, the term "at least partially move the canopy wings 138, 140 towards the extended position" implies that the canopy wings 138, 140 may be moved to the extended position or the canopy wings 138, 140 may be moved to the partially retracted position.

In some cases, the second control signal "C2" may be generated based on an absence of the object 104. For example, when the processors 212 determine that work machine 100 is not approaching any objects 104, the processors 212 may generate the second control signal "C2" to move the canopy assembly 124 towards the raised position or the partially lowered position, or move the canopy wings 138, 140 towards the extended position or the partially retracted position.

The processors 212 may transmit the first control signal "C1" and the second control signal "C2" to the first actuation system 132. Alternatively, the processors 212 may transmit the first control signal "C1" and the second control signal "C2" to the second actuation system 142. In one example, upon receiving the second control signal "C2", the first actuation system 132 moves the canopy assembly 124 towards the raised position or the partially lowered position. In another example, upon receiving the second control signal "C2", the second actuation system 142 moves one or both of the canopy wings 138, 140 towards the extended position or the partially retracted position.

INDUSTRIAL APPLICABILITY

The present disclosure relates to the canopy system 200 associated with the work machine 100. The canopy system 200 includes the canopy assembly 124 that may be automatically movable between the lowered position and the raised position, without operator intervention. Further, automating the process of moving the canopy assembly 124 may allow the operator to focus on other aspects of machine control or other operations at the worksite. The canopy assembly 124 may be automatically movable based on the presence or the absence of the object 104 proximate to the work machine 100. In some cases, the canopy assembly 124 may be at least partially lowered to avoid collision between the canopy assembly 124 and the object 104 proximate to the work machine 100.

Further, one or both of the canopy wings 138, 140 of the canopy assembly 124 may be movable relative to the main canopy panel 126 based on the presence or the absence of the object 104. In some cases, one or both of the canopy wings 138, 140 of the canopy assembly 124 may be at least partially retracted to avoid any collision between the canopy wings 138, 140 and the object 104. Thus, the canopy system 200 described herein may prevent damage to the canopy assembly 124 or the canopy wings 138, 140 by preventing collision of the canopy assembly 124 or the canopy wings 138, 140 with the object 104, thereby reducing machine downtime, repair costs, or replacement costs associated with the canopy assembly 124.

The controller 208 of the canopy system 200 identifies the object 104 proximate the work machine 100. Further, the processors 212 of the controller 208 generate the first control signal "C1" to automatically lower the canopy assembly 124 and/or retract the canopy wings 138, 140 to prevent damage to the canopy assembly 124 and the canopy wings 138, 140. Further, in the lowered position, the canopy assembly 124 does not obstruct the line of sight from the operator station 122, thereby increasing an overall operator experience, operator efficiency, as well as operator comfort. Furthermore, the canopy assembly 124 does not interfere with any part of the operator station 122 while the canopy assembly 124 moves between the lowered position and the raised position. Additionally, the canopy assembly 124 does not encroach a work area of the operator station 122. Thus, the switching of the canopy assembly 124 between the lowered and raised positions does not interfere with the operations being performed by the operator.

Figure 6:
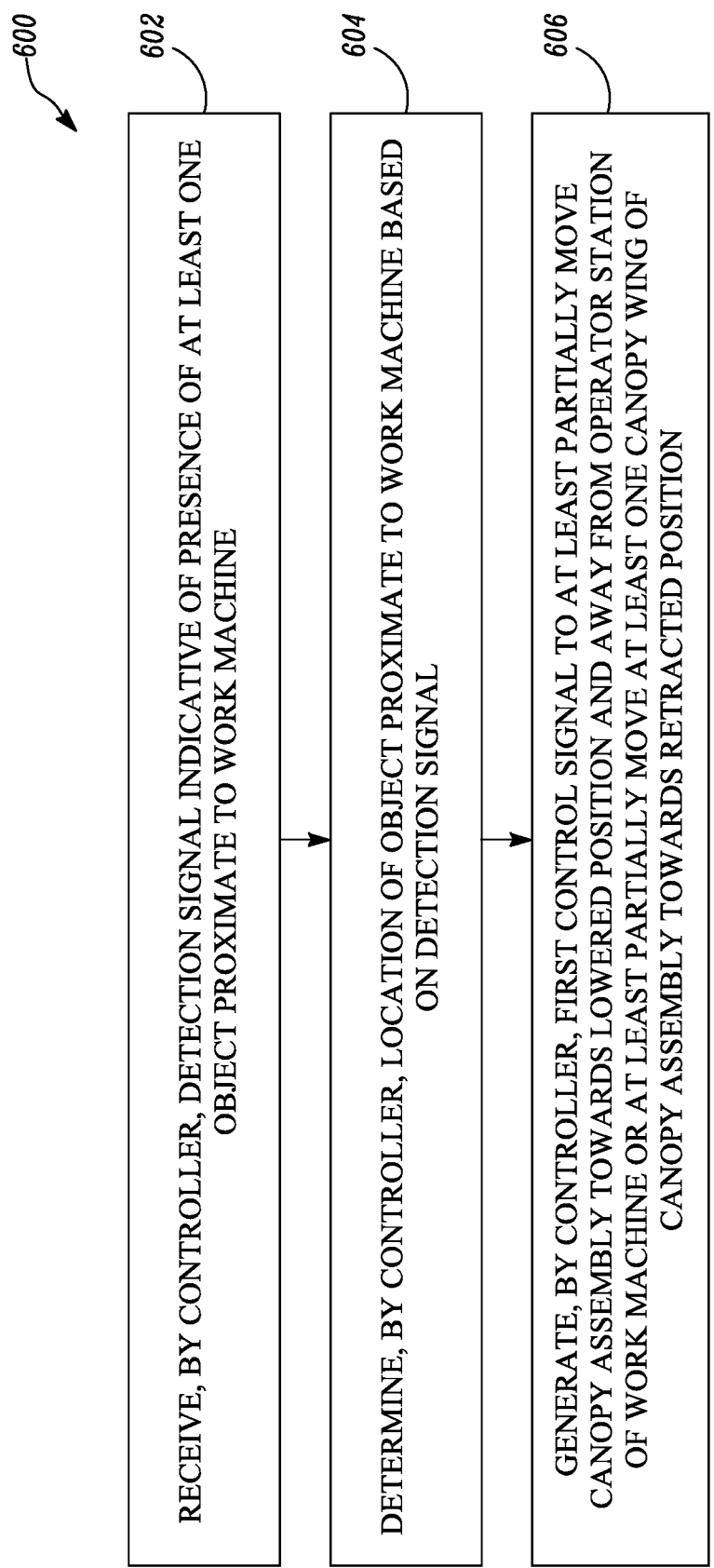
FIG. 6 is a flowchart depicting a method of preventing collision of the canopy assembly of the work machine with an object proximate to the work machine, according to an example of the present disclosure.

Referring to FIG. 6, a flowchart for a method 600 of preventing collision of the canopy assembly 124 of the work machine 100 with the object 104 proximate to the work machine 100 is illustrated. At step 602, the controller 208 receives the detection signal "S1" indicative of the presence of the object 104 proximate to the work machine 100. In some examples, the sensor system 202 receives the detection signal "S1". The sensor system 202 includes the sensor 204, 206 mounted on the frame 112 of the work machine 100 or the canopy assembly 124. The sensor system 202 includes the LIDAR, the RADAR, the ultrasonic sensor, the infrared sensor, the photoelectric sensor, the magnetic sensor, the imaging device, or a combination thereof.

At step 604, the controller 208 determines the location (or distance) of the one or more objects 104 proximate to the work machine 100 based on the detection signal "S1". At step 606, the controller 208 generates the first control signal "C1" to at least partially move the canopy assembly 124 towards the lowered position and away from the operator station 122 of the work machine 100 or at least partially move the canopy wing 138, 140 of the canopy assembly 124 towards the retracted position. In the lowered position, the canopy assembly 124 is disposed ahead of the operator station 122 relative to the machine travel direction "D1" and does not obstruct the line of sight from the operator station 122.

In some examples, the controller 208 further generates the second control signal "C2" to at least partially move the canopy assembly 124 towards the raised position or at least partially move the canopy wing 138, 140 towards the extended position based on the absence of the object 104 proximate to the work machine 100. In the raised position, the canopy assembly 124 is disposed above the operator station 122.

In some examples, the controller 208 transmits the first control signal "C1" and the second control signal "C2" to the first actuation system 132. The first actuation system 132 moves the canopy assembly 124 between the lowered position and the raised position.

In some examples, the controller 208 transmits the first control signal "C1" and the second control signal "C2" to the second actuation system 142. The second actuation system 142 moves the canopy wing 138, 140 between the retracted position and the extended position.

If desired, the canopy system 200 can be provided with controls (not shown) that allow the operator of the work machine 100 to cause retraction and/or extension of one or more of the canopy assembly 124 and/or canopy wings 138, 140. A control (not shown) allowing the operator to enable or disable canopy system 200 is also contemplated.

While aspects of the present disclosure have been particularly shown and described with reference to the embodiments above, it will be understood by those skilled in the art that various additional embodiments may be contemplated by the modification of the disclosed work machines, systems and methods without departing from the spirit and scope of the disclosure. Such embodiments should be understood to fall within the scope of the present disclosure as determined based upon the claims and any equivalents thereof.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

What is claimed is:

1. A canopy system for a work machine, the canopy system comprising:
    a canopy assembly movable between a lowered position and a raised position, wherein, in the lowered position, the canopy assembly is disposed ahead of an operator station of the work machine relative to a machine travel direction and does not obstruct a line of sight from the operator station, wherein, in the raised position, at least a portion of the canopy assembly is disposed above the operator station, and wherein the canopy assembly includes a main canopy panel and at least one canopy wing, such that the canopy wing is movable relative to the main canopy panel between an extended position and a retracted position;
    a sensor system configured to generate a detection signal indicative of a presence of at least one object proximate to the work machine; and
    a controller communicably coupled with the canopy assembly and the sensor system, the controller including at least one memory and at least one processor communicably coupled to the memory, wherein the processor is configured to:
        receive the detection signal from the sensor system;
        determine a location of the object proximate to the work machine based on the detection signal; and
        generate a first control signal to at least partially move the canopy assembly towards the lowered position and away from the operator station or at least partially move the canopy wing towards the retracted position.

2. The canopy system of claim 1, wherein the processor is further configured to generate a second control signal to at least partially move the canopy assembly towards the raised position or at least partially move the canopy wing towards the extended position.

3. The canopy system of claim 2, wherein the canopy assembly includes a first actuation system configured to move the canopy assembly between the lowered position and the raised position, and wherein the processor is configured to transmit the first control signal and the second control signal to the first actuation system.

4. The canopy system of claim 2, wherein the canopy assembly includes a second actuation system configured to move the canopy wing between the retracted position and the extended position, and wherein the processor is configured to transmit the first control signal and the second control signal to the second actuation system.

5. The canopy system of claim 1, wherein the sensor system includes at least one of a light detection and ranging sensor (LIDAR), a radio detection and ranging sensor (RADAR), an ultrasonic sensor, an infrared sensor, a photoelectric sensor, a magnetic sensor, an imaging device, or a combination thereof.

6. The canopy system of claim 1, wherein the sensor system includes at least one first sensor mounted on a frame of the work machine.

7. The canopy system of claim 1, wherein the sensor system includes at least one second sensor mounted on the canopy assembly.

8. A work machine comprising:
    a frame;
    an operator station supported by the frame; and
    a canopy system including:
        a canopy assembly coupled to the frame, the canopy assembly being movable between a lowered position and a raised position, wherein, in the lowered position, the canopy assembly is disposed ahead of the operator station of the work machine relative to a machine travel direction and does not obstruct a line of sight from the operator station, wherein, in the raised position, at least a portion of the canopy assembly is disposed above the operator station, wherein the canopy assembly includes a main canopy panel and at least one canopy wing, such that the canopy wing is movable relative to the main canopy panel between an extended position and a retracted position;
        a sensor system configured to generate a detection signal indicative of a presence of at least one object proximate to the work machine; and
        a controller communicably coupled with the canopy assembly and the sensor system, the controller including at least one memory and at least one processor communicably coupled to the memory, wherein the processor is configured to:
            receive the detection signal from the sensor system;
            determine a location of the object proximate to the work machine based on the detection signal; and
            generate a first control signal to at least partially move the canopy assembly towards the lowered position and away from the operator station or at least partially move the canopy wing towards the retracted position.

9. The work machine of claim 8, wherein the processor is further configured to generate a second control signal to at least partially move the canopy assembly towards the raised position or at least partially move the canopy wing towards the extended position.

10. The work machine of claim 9, wherein the canopy assembly includes a first actuation system configured to move the canopy assembly between the lowered position and the raised position, and wherein the processor is configured to transmit the first control signal and the second control signal to the first actuation system.

11. The work machine of claim 9, wherein the canopy assembly includes a second actuation system configured to move the canopy wing between the retracted position and the extended position, and wherein the processor is configured to transmit the first control signal and the second control signal to the second actuation system.

12. The work machine of claim 8, wherein the sensor system includes at least one of a light detection and ranging sensor (LIDAR), a radio detection and ranging sensor (RADAR), an ultrasonic sensor, an infrared sensor, a photoelectric sensor, a magnetic sensor, an imaging device, or a combination thereof.

13. The work machine of claim 8, wherein the sensor system includes at least one first sensor mounted on the frame of the work machine.

14. The work machine of claim 8, wherein the sensor system includes at least one second sensor mounted on the canopy assembly.

15. A method of preventing collision of a canopy assembly of a work machine with at least one object proximate to the work machine, the method comprising:
   receiving, by a controller, a detection signal indicative of a presence of the object proximate to the work machine;
   determining, by the controller, a location of the object proximate to the work machine based on the detection signal; and
   generating, by the controller, a first control signal to at least partially move the canopy assembly towards a lowered position and away from an operator station of the work machine or at least partially move at least one canopy wing of the canopy assembly towards a retracted position, wherein, in the lowered position, the canopy assembly is disposed ahead of the operator station relative to a machine travel direction and does not obstruct a line of sight from the operator station.

16. The method of claim 15 further comprising generating, by the controller, a second control signal to at least partially move the canopy assembly towards a raised position or at least partially move the canopy wing towards an extended position, wherein, in the raised position, at least a portion of the canopy assembly is disposed above the operator station.

17. The method of claim 16 further comprising transmitting, by the controller, the first control signal and the second control signal to a first actuation system, wherein the first actuation system is configured to move the canopy assembly between the lowered position and the raised position.

18. The method of claim 16 further comprising transmitting, by the controller, the first control signal and the second control signal to a second actuation system, wherein the second actuation system is configured to move the canopy wing between the retracted position and the extended position.

19. The method of claim 15 further comprising receiving the detection signal from a sensor system, wherein the sensor system includes at least one sensor mounted on a frame of the work machine or the canopy assembly.

20. The method of claim 19, wherein the sensor system includes at least one of a light detection and ranging sensor (LIDAR), a radio detection and ranging sensor (RADAR), an ultrasonic sensor, an infrared sensor, a photoelectric sensor, a magnetic sensor, an imaging device, or a combination thereof.

* * * * *